United States Patent [19]
McGrew, Jr.

[11] Patent Number: 5,859,589
[45] Date of Patent: Jan. 12, 1999

[54] PRESSURE ALARM AND METHOD OF OPERATION FOR SEWAGE TREATMENT SYSTEM

[76] Inventor: Henry E. McGrew, Jr., 8365 Arapaho Trail, Shreveport, La. 71112

[21] Appl. No.: 20,071

[22] Filed: Feb. 6, 1998

Related U.S. Application Data

[60] Provisional application No. 60/058,569 Sep. 11, 1997.

[51] Int. Cl.[6] .................................................. G08B 21/00
[52] U.S. Cl. .......................... 340/614; 340/626; 73/305; 73/307
[58] Field of Search .................................. 340/614, 626, 340/623; 73/305, 306, 307, 308; 210/220, 256, 195.4

[56] References Cited

U.S. PATENT DOCUMENTS

| | | | |
|---|---|---|---|
| 2,640,977 | 6/1953 | Parisi | 340/614 |
| 3,104,678 | 9/1963 | Cole | 137/403 |
| 3,358,507 | 12/1967 | Montgomery | 73/290 |
| 3,583,437 | 6/1971 | Mastroianni | 137/558 |
| 3,840,867 | 10/1974 | Welk, Jr. | 340/614 |
| 3,858,602 | 1/1975 | Brym | 137/423 |
| 3,954,612 | 5/1976 | Wilkerson | 210/86 |
| 4,129,038 | 12/1978 | Leutenegger | 73/307 |
| 4,890,493 | 1/1990 | Johnson | 73/321 |
| 4,983,285 | 1/1991 | Nolen | 210/197 |
| 5,059,954 | 10/1991 | Beldham et al. | 340/614 |
| 5,549,818 | 8/1996 | McGrew | 210/195.4 |

Primary Examiner—Jeffery A. Hofsass
Assistant Examiner—Anh La
Attorney, Agent, or Firm—John M. Harrison

[57] ABSTRACT

A pressure alarm for sewage treatment systems such as waste-water or sewage treatment tanks which require water level control. In a preferred embodiment the pressure alarm includes a pressure sensing apparatus which includes a tee or elbow located in a tank or system aerator air line, a nipple set into the tee leg of the tee or the elbow and a ball float fitted with a shaft or neck extending through the nipple and receiving an air deflector. According to the method of this invention, the air deflector projects into the run of the tee or the elbow responsive to floating of the ball float upwardly in a high water condition in the treatment tank or system. Extension of the air deflector into the run of the tee or the elbow causes a pressure drop through the tee or elbow as air is deflected from the run of the tee through the tee leg or elbow. A control system including a pressure-sensitive switch, is provided, typically on a conventional compressor or blower for sensing this pressure drop and sounding an audible and/or a visual alarm.

24 Claims, 7 Drawing Sheets

PRESSURE ALARM AND METHOD OF OPERATION FOR SEWAGE TREATMENT SYSTEM

BACKGROUND OF THE INVENTION

CROSS-REFERENCE TO RELATED APPLICATIONS

This application claims the benefit of copending U.S. Provisional Application Ser. No. 60/058,569, filed Sep. 11, 1997.

1. Field of the Invention

This invention relates to alarm systems for high water conditions in water, waste-water or sewage treatment systems and tanks and more particularly, to a pressure-reducing apparatus attached to the air supply line of a treatment system or tank for effecting a reduction in the incoming aeration air pressure and a pressure-sensing system attached to the air supply compressor or mounted in or on the air supply line for indicating the pressure reduction by audible and/or visual alarms. In a preferred embodiment the pressure-reducing element includes a fitting such as a tee or elbow located in the incoming aeration air pressure line, a nipple which may be perforated in one embodiment and is typically threadably inserted in the leg of the tee or elbow, a slotted collar may be provided in the nipple in the perforated nipple embodiment of the invention and a float is extended below the nipple and is provided with a rod, shaft or neck that extends through the nipple and the tee leg or elbow and terminates at an air deflector that normally seats in the mouth of the nipple. According to the method of this invention, under conditions of high water or sewage in the treatment tank or system, the float is displaced upwardly, thus projecting the air deflector into the run of the tee or into the elbow, and causing a pressure drop through the tee or elbow, as air is deflected through the float neck or the collar slots and the perforations in the nipple mounted in the tee leg or elbow. This reduction in pressure is sensed by a pressure-sensing switch and control circuit mounted on a conventional air compressor or blower or in the air supply line, which control circuit typically includes audible and visual alarms for alerting treatment tank or system personnel as to the abnormally high water or sewage condition.

2. Description of the Prior Art

A variety of techniques and systems have been developed for detecting high water in waste-water and sewage treatment tanks and systems. Many of these devices are electrical in nature and depend upon a float mechanism of various design, which causes a short or other disrupted electrical connection under conditions of high water in the tank or system monitored, to thus sound an alarm and alert treatment tank or system personnel. Typical of these devices is the "Liquid Level Controlling Device" detailed in U.S. Pat. No. 3,104,678, dated Sep. 24, 1963, to Cole. The fluid controlling apparatus includes a pneumatic, single-diaphragm control mechanism coupled to a liquid supply control valve, for controlling the level of a liquid in a tank or vessel. U.S. Pat. No. 3,358,507, dated Dec. 19, 1967, to Montgomery, details a "Septic Tank Sludge Indicator" which includes an outer tube and an inner tube provided in the outer tube, with multiple selenium cells connected in parallel to each other and located within the inner tube. A light source is located adjacent to the outer tube, such that electric current emitted from the selenium cells and lighting the light is a function of the thickness of the sludge in the tank. U.S. Pat. No. 3,583,437, dated Jun. 8, 1971, to Mastroianni, details a "Whiteprint Duplicating Machine Liquid Supply System", which includes a metering device and a reservoir which receives a liquid developer. A pump elevates liquid from the bottom of a container to the top of the reservoir and a relay energizes a signal device such as a lamp or buzzer if the liquid level in the reservoir falls below a vertical air pipe connected to an air-sensitive switch and the reservoir. U.S. Pat. No. 3,858,602, dated Jan. 7, 1975, to Brym, details an "Air Operated Safety Shutoff System For Liquid Reservoir Feed". The system is designed to control the level liquid in a container and includes a pressurized air system for maintaining a valve in a liquid feed system in the open condition. A valve in a safety alarm system is closed during normal safe operation and any unsafe condition depressurizes the system to close the liquid feed line and engage the safety valve. A "Septic Tank System" is detailed in U.S. Pat. No. 3,954,612, dated May 4, 1976, to Wilkerson. The system is provided with an indicator above the ground surface to indicate the water level and the tributaries leading from the tank, so that any excess water in the tank may be pumped out of the tank before it causes backup of sewage upstream in the septic tank. U.S. Pat. No. 4,129,038, dated Dec. 12, 1978, to Leutenegger, details an "Apparatus For Indicating the Level of Liquids in the Containers or Watercraft". The compartment or container includes a float connected to a piston by a vertical piston rod. The piston rises in a cylinder when the float rises in response to admission of liquid into the compartment, such that the piston effects two timely spaced compressions of a confined gas, which actuates a pilot valve for a flow-regulating valve when the pressure of the confined gas reaches a preselected value. Warning signals are provided for signaling "full" and "empty" conditions of the tank or compartment. An "Automatic Tank Reading Gauge" is detailed in U.S. Pat. No. 4,890,493, dated Jan. 2, 1990, to Johnson et al. The device includes an elongated, flexible measuring member having a scale with a float affixed to one end and a counterweight at the other end. A measuring member is positioned within an O-shaped body having a weep hole, an air check valve and a top sight area. When the body is placed through a filler hole to extend to the bottom of a tank, the volume of fluid within the tank is indicated at the top sight area. U.S. Pat. No. 5,549,818, dated Aug. 27, 1996, to McGrew, details a "Sewage Treatment System", including a cylindrical tank fitted with an air distribution system for aerating the sewage in the tank. The tank is typical of the system in which the pressure alarm for sewage treatment of this invention can be utilized.

It is an object of this invention to provide a pressure alarm and method of operation for water and sewage treatment systems, including treatment tanks and vessels, which alarm is characterized by a float-type pressure-reducing element that responds to a high water or sewage condition in the tank or vessel and reduces air pressure in the air supply system and a pressure-sensing element that senses this reduction in the pressure of the aeration air flowing into the tank, to sound and/or visually indicate an alarm.

Another object of the invention is to provide a pressure alarm and method of operation for sewage and waste-water treatment systems, which alarm includes a pressure-reducing apparatus, typically including a tee or elbow located in the aeration air line entering the system or tank, a float located beneath the tee or elbow and aligned with a pipe or nipple, which may be perforated and is typically threaded into the tee or elbow leg and a shaft or neck connecting the float to an air deflector normally seated in the top of the nipple inside the line. According to the method of this invention the air deflector is designed to extend upwardly into the tee run or elbow when the water or sewage rises abnormally high in the tank or vessel, responsive to flotation of the float and air pressure is reduced in the tee run or elbow and the air line, as air is diverted from the tee run or elbow through the float neck or the perforations in the pipe or nipple.

Still another object of this invention is to provide a pressure alarm for sewage and waste-water treatment tanks and a method for indicating a high water or sewage condition in a tank or vessel, which alarm includes a pressure-reducing air deflector system for deflecting air from the aeration air line extending into the tank responsive to operation of a float, wherein the pressure reduction in the aeration air line is sensed by a pressure-sensing switch and control system mounted on a pump or blower or in or on the aeration air line, for indicating, visually, audibly or both, the high water or sewage condition in the tank.

Yet another object of this invention is to provide a new and improved pressure alarm and method for sewage treatment tanks and systems, which alarm system includes a pressure-reducing apparatus characterized by a tee or an elbow located in the aeration line extending into the tank, a nipple, (which may be perforated), threaded into or otherwise seated in the tee leg of the tee or in the elbow, a ball float located beneath the tee or elbow and the nipple and fitted with a shaft or ball neck projecting through the nipple and terminating in an air deflector which normally seats in the mouth of the nipple and allows air to flow freely through the run of the tee, or to bypass the elbow. The air is caused to flow through the aeration line and tee run and normally bypass the elbow by means of a conventional pump or blower which is typically fitted with a pressure-sensing switch and control system for monitoring the pressure of the aeration air. According to the method of this invention, when a high water or sewage condition exists in the tank, the buoyant ball float is forced upwardly, thereby elevating the air deflector into the run of the tee or into the elbow and deflecting air through the nipple and the air spaces or passages in the ball neck or the perforations in the nipple, thus reducing the pressure of the air in the run of the tee or elbow. This pressure reduction is sensed by the pressure switch mounted on the blower or pump or elsewhere pneumatically connected to the aeration line. This decrease in air pressure triggers either a visual, audible or both, alarm by operation of the pressure switch control system, thus indicating the high water condition in the tank or system.

Another object of this invention is to provide a method for indicating a high water, waste-water or sewage condition in a tank or vessel by pressure differential, which method includes the steps of providing a float beneath an air supply line to the tank or vessel; mounting an air deflector on the float for extension into the air supply line responsive to flotation of the float with the high water or sewage and diverting air from the air supply line to create a pressure reduction in the air supply line; providing a pressure-sensing device in pneumatic association with the air supply line for sensing the pressure reduction in the air supply line; and providing an alarm system in association with the pressure-sensing device for indicating an alarm in the high water or sewage condition.

SUMMARY OF THE INVENTION

These and other objects of the invention are provided in a new and improved pressure alarm for, and method of operation of, water, waste-water and sewage treatment systems and treatment tanks or vessels in particular, which alarm is characterized by a pressure-reducing system mounted in the air line extending into the tank and a pressure-sensing switch and control system attached to a pump or blower or located in the aeration line or elsewhere in the alarm apparatus, for monitoring the pressure of the air flowing through the air line and sensing and sounding and/or visually indicating an alarm in the event of a high water or sewage condition in the tank or vessel and a low pressure condition in the air line. The pressure reduction system of the alarm includes a tee or an elbow mounted in the air line, with a nipple, such as a radially-perforated nipple, threadably or otherwise mounted in the leg of the tee or in one end of the elbow and a flotation ball or bulb positioned beneath the tee or elbow and fitted with a ball neck having one or more longitudinal air passages, or a rod or shaft extending through the nipple bore. A slotted ball collar may be extended from the nipple and a tapered or o-ring-equipped air deflector is provided on the opposite end of the ball neck or shaft at the tee leg or elbow and is normally seated by gravity in the mouth of the nipple bore to provide an unobstructed path for the aeration air normally flowing through the run of the tee or bypassing the elbow. According to a preferred method of operation, under circumstances of high water or sewage in the tank, the rising water floats the buoyant flotation ball upwardly, thereby displacing the air deflector into the stream of air in the tee run or elbow and deflecting some of the air flowing through the tee run or elbow through the air passage or passages in the ball neck or around the ball shaft, through the nipple bore and the ball collar slots, as well as the radial perforation(s) in the nipple, thus reducing the air pressure in the tee run or elbow. The resulting reduction of air pressure in the air line is sensed by a pressure-sensing switch connected to an alarm circuit, which switch and circuit are typically mounted on the pump or blower supplying air to the tank or system, and the control system thereby signals an alarm, either visual or audible or both, thus warning of the high water condition in the tank or system.

BRIEF DESCRIPTION OF THE DRAWINGS

The invention will be better understood by reference to the accompanying drawings, wherein.

DESCRIPTION OF THE PREFERRED EMBODIMENTS

Figure 1:
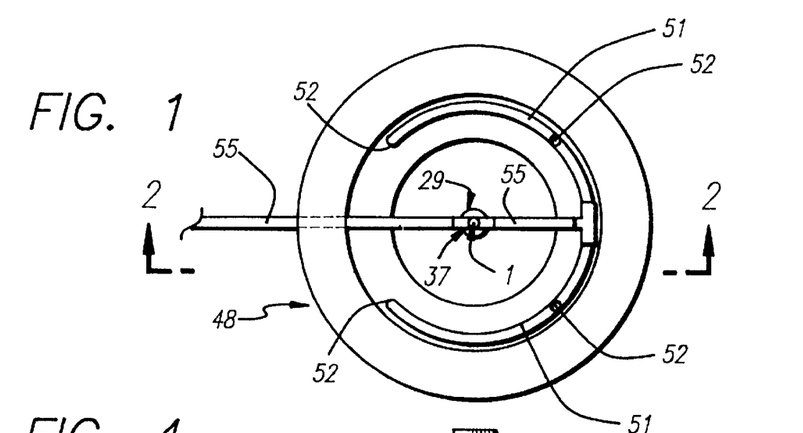
FIG. 1 is a top view of a typical waste-water or sewage treatment tank or vessel, with one embodiment of the pressure-reducing apparatus of this invention illustrated therein.
Figure 1A:
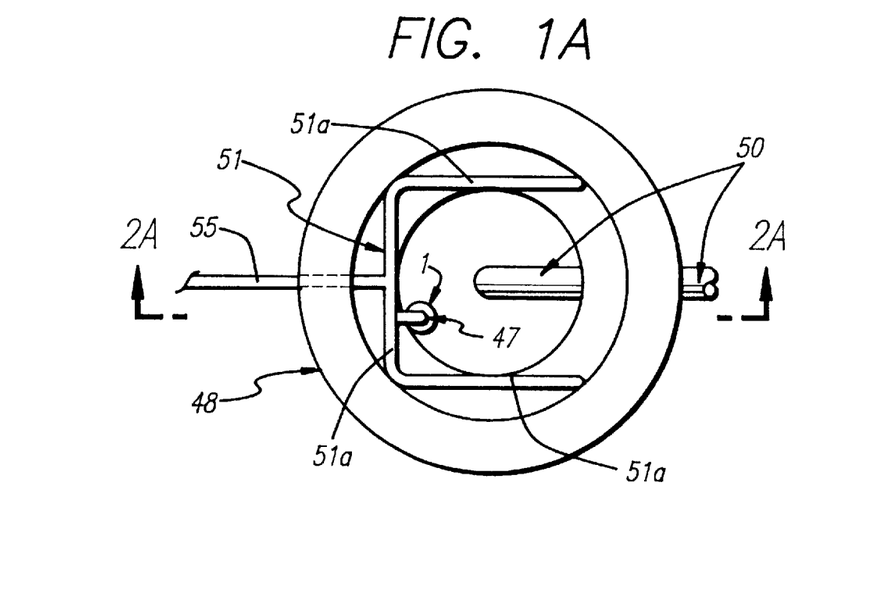
FIG. 1A is a top view of the treatment tank or vessel illustrated in FIG. 1, with a pressure-reducing apparatus of slightly different design positioned in a different location.
Figures 2, 4:
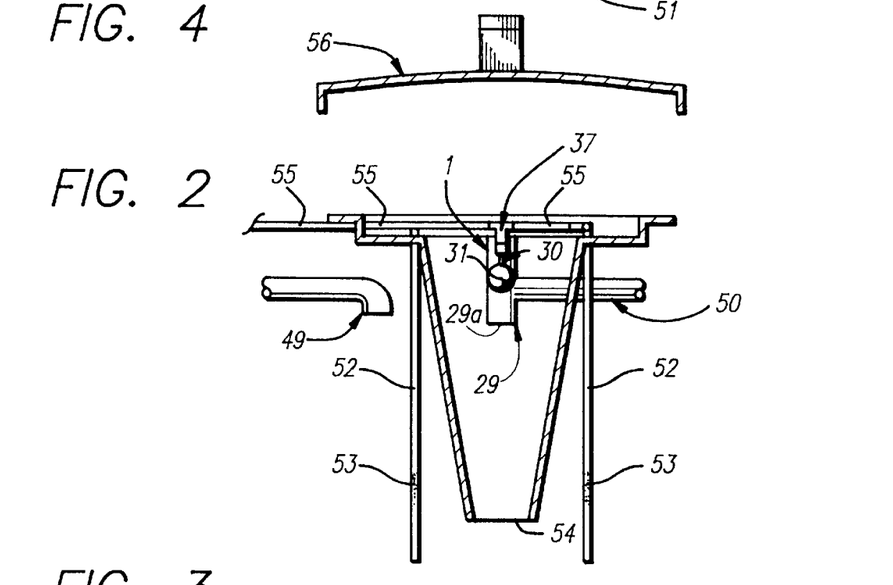
FIG. 2 is a side sectional view of a typical treatment cone and air drop lines extending from an air distribution line, more particularly illustrating a typical positioning of the pressure-reducing apparatus in the embodiment illustrated in FIG. 1.
FIG. 4 is a typical lid or top for the treatment tank or vessel illustrated in FIGS. 1–3.
Figure 2A:
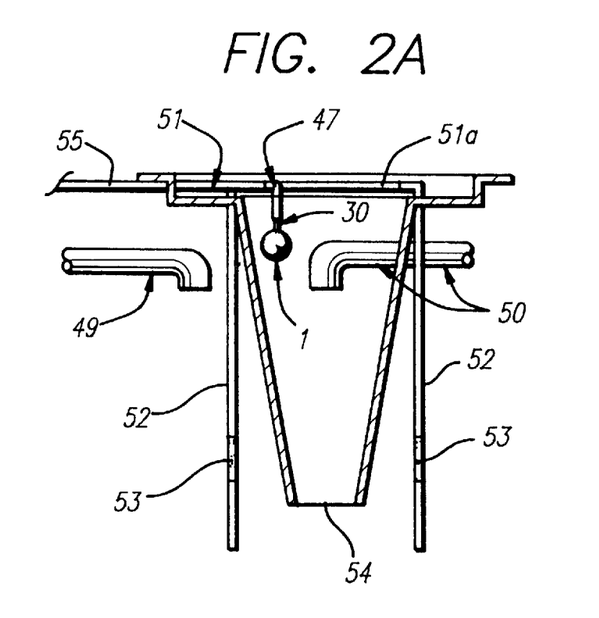
FIG. 2A is a side sectional view of the treatment tank or vessel illustrated in FIG. 1A, further illustrating the alternative pressure-reducing apparatus embodiment and location illustrated in FIG. 1A.
Figure 3:
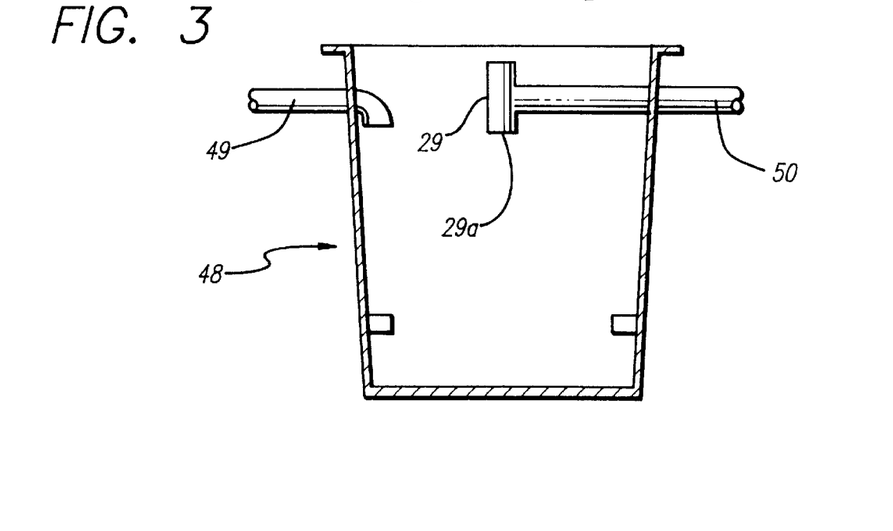
FIG. 3 is a side sectional view of a typical treatment tank or vessel for receiving the cone and air distribution and drop line elements illustrated in FIG. 2.

Referring initially to FIGS. 1–6B of the drawings, the pressure-reducing apparatus of the pressure alarm of this invention is generally illustrated by reference numeral 1. The pressure-reducing element 1 is typically installed in an air supply line 55 which supplies aeration air at a selected pressure to an air distribution line 51 (FIG. 1) and distribution line legs 51a (FIG. 1A). The air is then channelled through multiple air drop lines 52, extending from the air distribution line 51 and the distribution line legs 51a and having multiple diffusor openings 53 therein, as illustrated in FIGS. 2 and 2A. The air distribution line 51, distribution line legs 51a and the air drop lines 52, respectively, are typically a part of the treatment tanks 48, which typically also each include a tank top 56 and a clarifier 54, as described in my U.S. Pat. No. 5,549,818, issued Aug. 27, 1996. As further illustrated in FIG. 3, a sewage inlet line 49 is typically directed into each treatment tank 48 and an effluent discharge line 50 projects from the opposite side of the treatment tanks 48 in conventional fashion.

In the embodiment of the invention illustrated in FIGS. 1 and 2, the pressure-reducing apparatus 1 of the pressure alarm device of this invention is mounted in the pipe bore 29a of a vertical float sensor pipe 29, typically mounted on the effluent discharge line 50. The pressure-reducing element 1 includes a float sensor 30, attached to a tee 37, typically fitted in the air supply line 55 of the treatment tank 48. Operation of the float sensor 30 in several variations is hereinafter described as preferred embodiments of the method of this invention.

As further illustrated in FIGS. 1A and 2A, in another embodiment of the invention the pressure-reducing apparatus 1 is mounted to one of the distribution line legs 51a of the box-shaped air distribution line 51, spaced from the effluent discharge line 50. The air drop lines 52 extend downwardly from the ends and corners, respectively, of the air distribution line 51, as illustrated in FIG. 2A, and, while the pressure-reducing apparatus 1 can be mounted in a tee 37, as illustrated in FIGS. 1 and 2, it is preferably mounted in one end of an elbow 47.

Figures 5, 6:
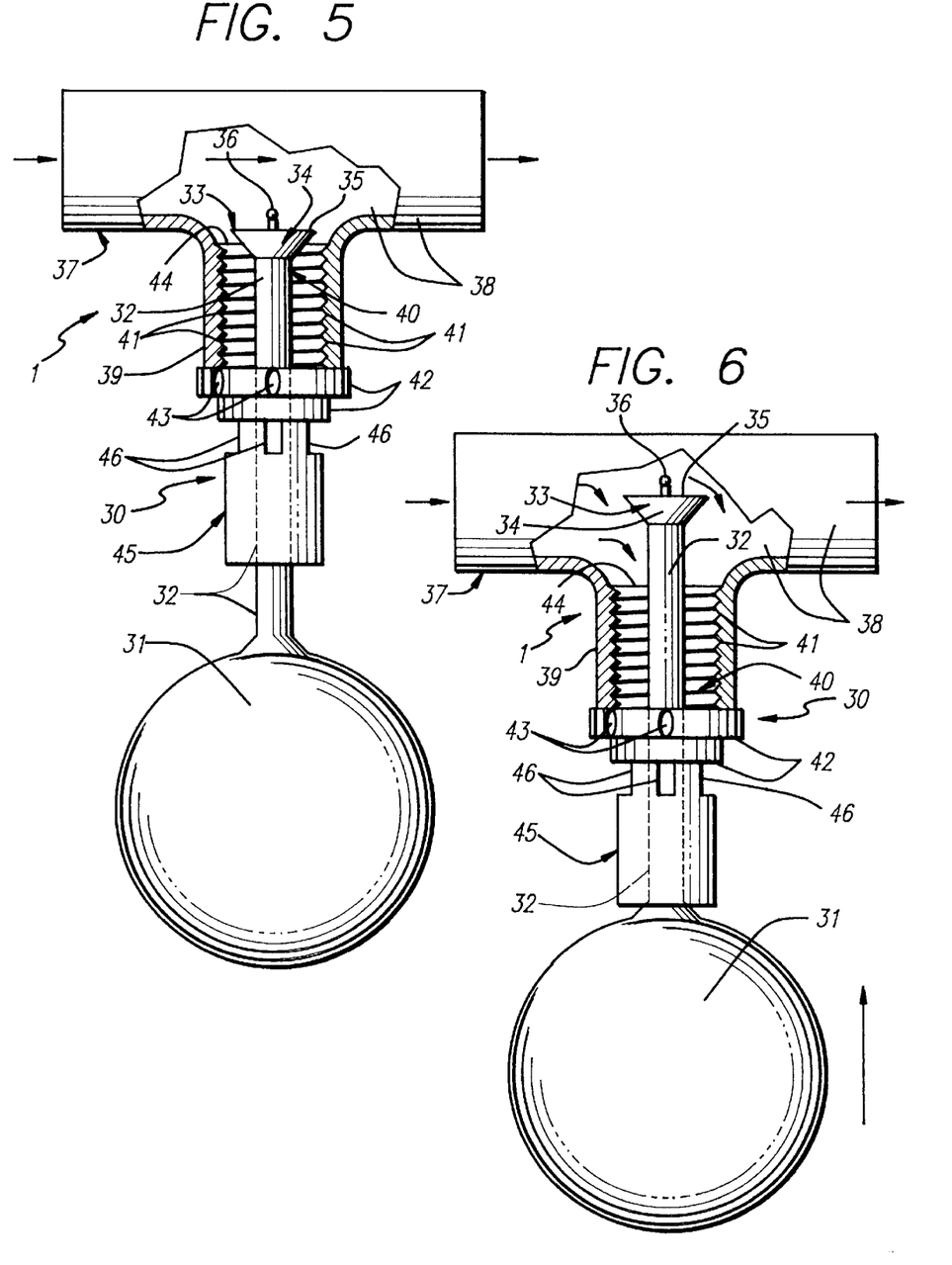
FIG. 5 is a side view, partially in section, illustrating a preferred embodiment of the pressure-reducing apparatus of the invention illustrated in FIGS. 1 and 2, in low waste-water or sewage mode.
FIG. 6 is a side view, partially in section, of the pressure-reducing apparatus illustrated in FIG. 5 in pressure-reducing, high waste-water or sewage configuration.
Figure 5A:
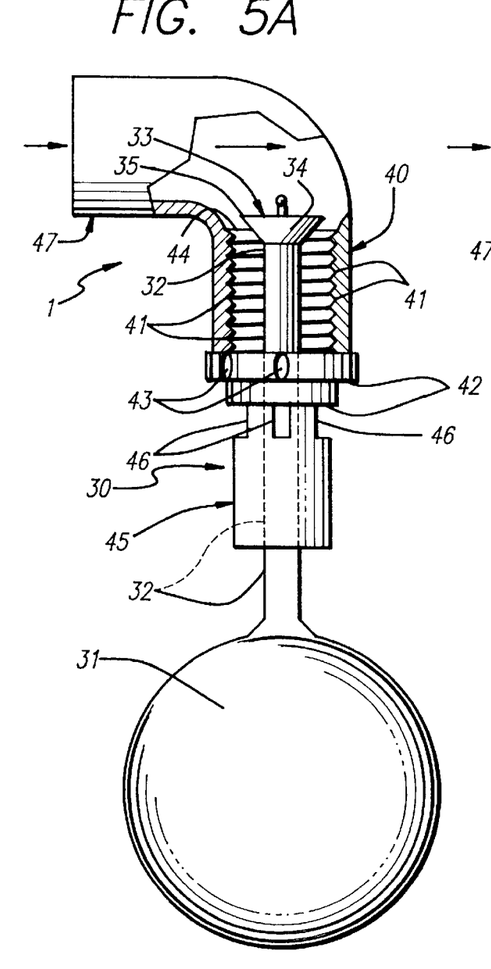
FIG. 5A is a side view, partially in section, of an alternative preferred embodiment of the pressure-reducing apparatus of the invention illustrated in FIGS. 1A and 2A, in low waste-water or sewage mode.
Figure 5B:
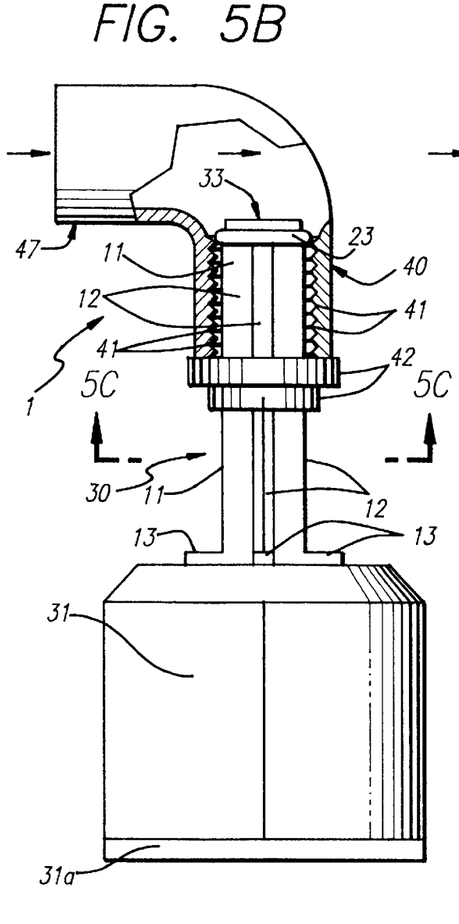
FIG. 5B is a side view, partially in section, of a most preferred embodiment of the pressure-reducing apparatus of this invention in low waste-water or sewage configuration.
Figure 5C:
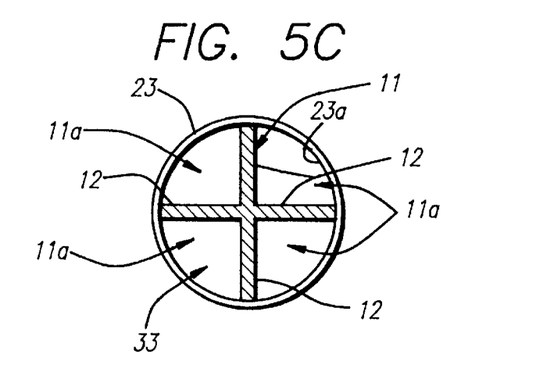
FIG. 5C is a sectional view, taken along line 5c—5c of the float neck element of the pressure-reducing apparatus illustrated in FIG. 5B.
Figure 6A:
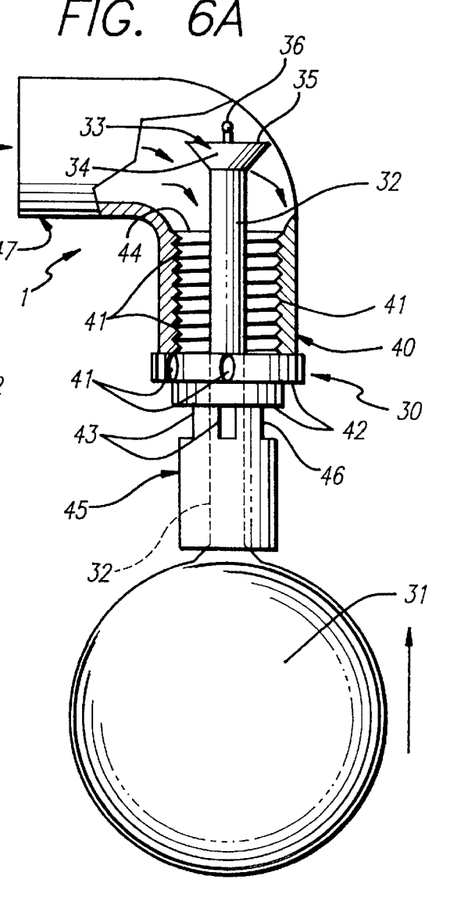
FIG. 6A is a side view, partially in section, of an alternative preferred embodiment of the pressure-reducing apparatus illustrated in FIG. 5A in pressure-reducing, high waste-water or sewage configuration.

Referring now to FIGS. 1–2A, 5, 6, 5A, 5B, 5C, 6A and 6B, of the drawings, the float sensor 30 element of the pressure-reducing apparatus 1 illustrated in FIGS. 1, 2, 1A and 2A, respectively, is further characterized by a buoyant ball float 31, having a ball shaft or rod 32 extending upwardly through a slotted ball collar 45 (FIGS. 5–6A), which is fixed to, or shaped integrally with, a nipple 40, having a nipple bore (not illustrated) and a nipple base 42, fitted with radially spaced-apart air bypass openings 43 (FIGS. 5–6A). The nipple 40 may also typically be provided with external nipple threads 41 for threadably engaging internal threads (not illustrated) provided in the tee leg 39 of the tee 37 (FIGS. 1, 2, 5 and 6) or the elbow 47 (FIGS. 1A, 2A, 5A and 6A), for installing the nipple 40 inside the tee leg 39 or the elbow 47, respectively. Alternatively, the nipple threads 41 may be eliminated in favor of gluing the nipple 40 in the tee leg 39 or in the elbow 47, respectively, or even in an opening cut in the air supply line 55 (FIGS. 1 and 2) or the distribution line legs 51a (FIGS. 1A and 2A). As illustrated in FIGS. 5, 6, 5A and 6A, the top peripheral edge of the ball collar 45 at the nipple 40 is provided with vertically-oriented collar slots 46, that cooperate with the radially-disposed air bypass openings 43 provided in the nipple base 42 of the nipple 40, for purposes which will be hereinafter further described. A preferably tapered air deflector 33 is attached to the opposite or top end of the ball shaft 32, typically by means of a deflector bolt 36, as illustrated in FIG. 6. The air deflector 33 typically has a tapered deflector wall 34, which terminates in a flat deflector top 35 and is constructed of rubber, plastic or other resilient or sealing material to effect a seal between the tapered deflector wall 34 and the nipple mouth 44 of the nipple 40. Accordingly, it will be appreciated from a consideration of FIGS. 5 and 5A, that the ball shaft 32 extends upwardly from the ball float 31 through the hollow interior of the ball collar 45 and the nipple bore of the nipple 40, where the air deflector 33 normally seats in the nipple mouth 44 of the nipple 40.

Referring again to FIGS. 6 and 6A of the drawings, under circumstances where a high water or sewage condition exists in the treatment tank 48, according to a preferred method of this invention, the water floats the buoyant ball float 31. This action forces the ball shaft 32 upwardly, and causes the preferably tapered, resilient deflector wall 34 of the air deflector 33 to disengage the nipple mouth 44 in the nipple 40. This causes the air deflector 33 to extend into the tee run 38 of the tee 37 (FIGS. 1 and 2) or the elbow 47 (FIGS. 1A and 2A), as illustrated in FIGS. 6 and 6A, respectively. This position of the air deflector 33 partially interrupts the flow of air through the tee run 38 from the air supply line 55 and the air distribution line 51, as illustrated in FIG. 6. A portion of the air is deflected by the air deflector 33 downwardly through the tee leg 39 (FIG. 6) and the elbow 39 (FIG. 6A), the nipple bore 44 and the air bypass openings 43 of the pressure nipple 40 and the collar slots 46 of the ball collar 45, into the float sensor pipe 29 (FIGS. 1 and 2) or into the clarifier 54 (FIGS. 1A and 2A). Accordingly, the air pressure in the tee run 38 and the elbow 47, as well as the air supply line 55 falls and this reduction in air pressure is sensed by the pressure sensing system of the invention, generally illustrated by reference numeral 1a and further illustrated in FIGS. 7, 8 and 8A of the drawings.

Figure 6B:
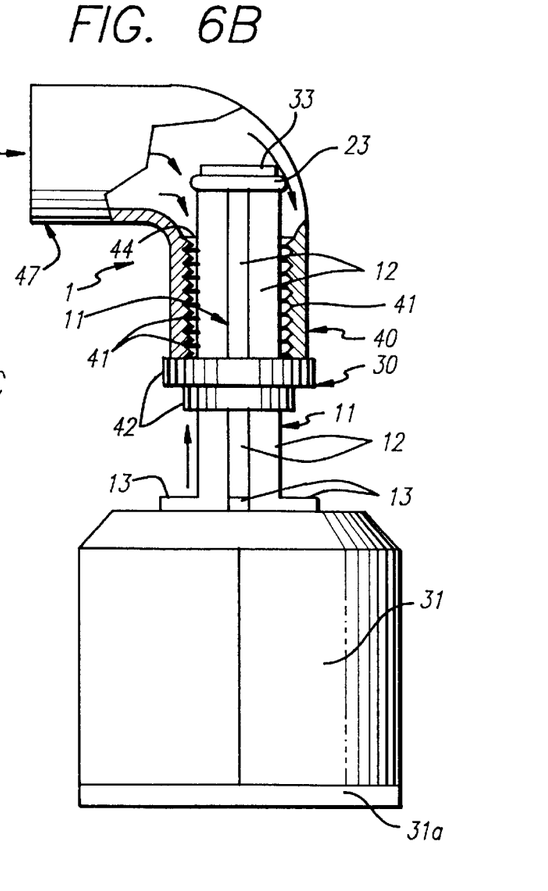
FIG. 6B is a side view, partially in section, of the embodiment of the pressure-reducing apparatus illustrated in FIG. 5B in pressure-reducing, high waste-water or sewage configuration.

In a most preferred embodiment of the invention, the pressure-reducing apparatus 1 is detailed in FIGS. 5B, 5C and 6B of the drawings, wherein the ball float 31 is more cylindrically-shaped and preferably has a float cap 31a provided on the bottom thereof for insertion of flotation material or repair. The float neck 11 preferably has an x-shaped cross-section defined by neck ribs 12, to define longitudinal air passages 11a (FIG. 5C) upon the extending ends of which float neck 11 is provided an air deflector 33, fitted with an o-ring 23, seated in an o-ring seat 23a. The opposite end of the float neck terminates in rib feet 13 connected to or formed integrally with the ball float 31. Accordingly, when the water, waste-water or sewage in the treatment tank 48 is below the ball float 31, the air deflector 33 is seated in the nipple mouth 44 of the non-perforated nipple 40 and is sealed therein by the o-ring 23, as illustrated in FIG. 5B. When the water, waste-water or sewage in the treatment tank 48 rises and causes the ball float 31 to also rise, the float neck 11 moves upwardly in the bore of the nipple 40, thus causing the air deflector 33 and o-ring 23 to extend from the nipple mouth 44 and allow air in the elbow 47 to flow between the air deflector 33 and the nipple mouth 44, downwardly through the spaces or air passages 11a between the adjacent neck ribs 12 (FIG. 5C), into the treatment tank 48. This position of the ball float 31 facilitates a reduction in air pressure in the air supply line 55, which reduction is sensed by the pressure-sensing apparatus or system, as hereinafter described.

Figure 7:
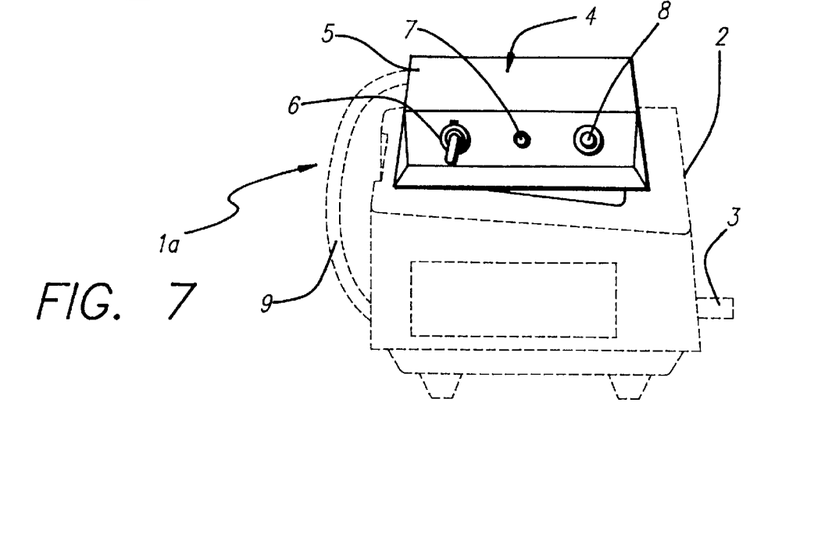
FIG. 7 is a perspective view of a typical conventional blower or compressor having a pressure-sensing switch and control system for sensing the pressure reduction effected by the pressure-reducing apparatus illustrated in FIGS. 5–6B.

Referring now to FIG. 7 of the drawings, the pressure sensing apparatus or system 1a of this invention operates in cooperation with an air compressor or blower 2 (illustrated in phantom) and includes a pressure sensor 4, typically characterized by a sensor housing 5, typically provided with an on-off switch 6, a low pressure warning light 7 and typically with a circuit breaker 8. The pressure sensor 4 is typically, but not necessarily, mounted on the air compressor or blower 2, and is pneumatically connected to the compressor discharge 3 that communicates with the air supply line 55 to the treatment tank 48, illustrated in FIGS. 1–2A. A power cord 9 (illustrated in phantom) connects the pressure sensor 4 to the air compressor 2 and typical circuits for operating the alarm components of the pressure sensor 4 are detailed in FIGS. 8 and 8A, depending upon whether a battery or power outlet connection is desired in the circuit.

Figure 8:
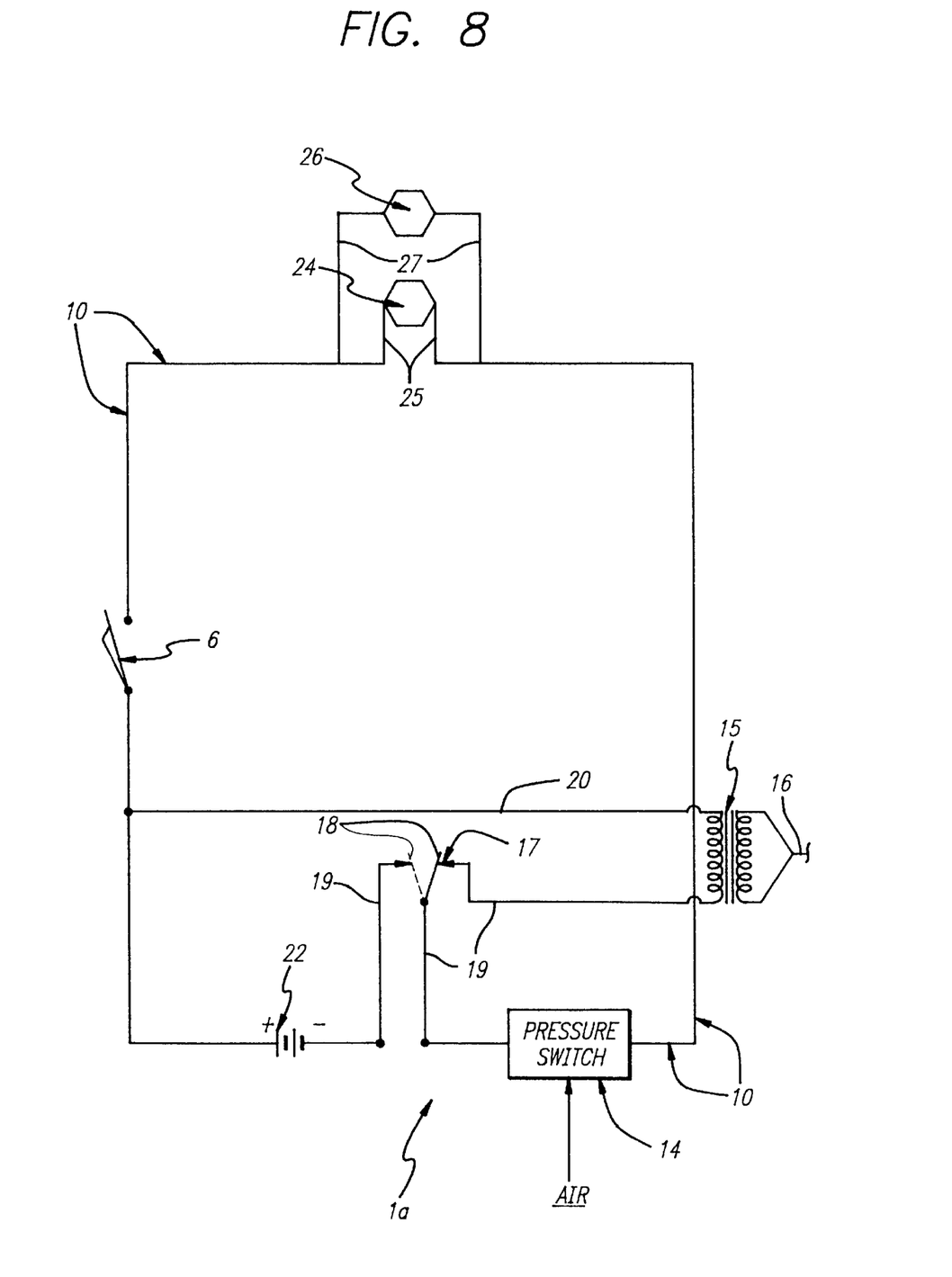
FIG. 8 is a schematic of a typical electrical circuit for operating the pressure sensor illustrated in FIG. 7.

Referring to FIG. 8 of the drawings, the pressure-sensing apparatus 1a is typically enclosed in the sensor housing 5 (FIG. 7) and is characterized by circuit wiring 10, which most preferably includes the on-off switch 6, battery 22, an alarm lamp 24, electrically connected to the circuit wiring 10 by means of alarm lamp wiring 25 and an optional audio alarm 26, electrically connected to the circuit wiring 10 by means of audio alarm wiring 27. Further included in the circuit wiring 10 is a transformer 15, connected to power source wiring 16 and to the circuit wiring 10, by means of transformer wiring 20 and a relay 17. A pressure switch 14 communicates pneumatically with the air supply line 55 as heretofore described and may be mounted in the pressure sensing element 1a or at any desired point on the air supply line 55. The pressure switch 14 is selected to activate an alarm or alarms responsive to the reduction in air pressure in the air supply line 55 and may be selected to sense any desired pressure drop in the air supply line 55. For example, air pressure in the air supply line 55 might typically be about 5 to about 15 psig by operation of the air compressor or blower 2 and the pressure switch 14 can be chosen to operate the alarm or alarms at a pressure reduction typically from ¼ of a pound or greater. A typical pressure switch 14 for application in the pressure-sensing apparatus 1a system of this invention is the type 118B 21WF/25WR switch manufactured by Pres Air Trol of Mamaroneck, N.Y. Accordingly, further according to the method of this invention, while the air pressure in the air supply line 55 and the tee run 38 of the tee 37 remains at an acceptable level, typically in the range of from about 5 to about 15 psi, by operation of the air compressor or blower 2, that air pressure maintains the pressure switch 14 in non-alarm mode. However, should the air pressure in the air supply line 55 and the tee run 38 of the tee 37 or the elbow 47 fall to the preselected level of activation of the chosen pressure switch 14, or the chosen level of a selected multi-pressure or alternative switch 14, by operation of the pressure-reducing element 1 as heretofore described, the pressure switch 14 will allow current to flow through the circuit wiring 10, thus activating the alarm lamp 24 and audio alarm 26. Accordingly, it will be appreciated by those skilled in the art that the circuit wiring 10 and the pressure switch 14 operate to warn of a high water, waste-water or sewage condition in the treatment tank or vessel 48. The relay 17 is wired to the circuit wiring 10 and the transformer 15 by means of relay wiring 19 and serves to normally operate the pressure-sensing element 1a from the power source wiring 16, which current is converted typically to 9 volt D.C. by the transformer 15. In the event of power failure, the relay contact 18 switches from the indicated position to the phantom position to effect energizing of the circuit wiring 10 upon operation of the pressure sensing element 1a, by operation of the battery 22.

Figure 8A:
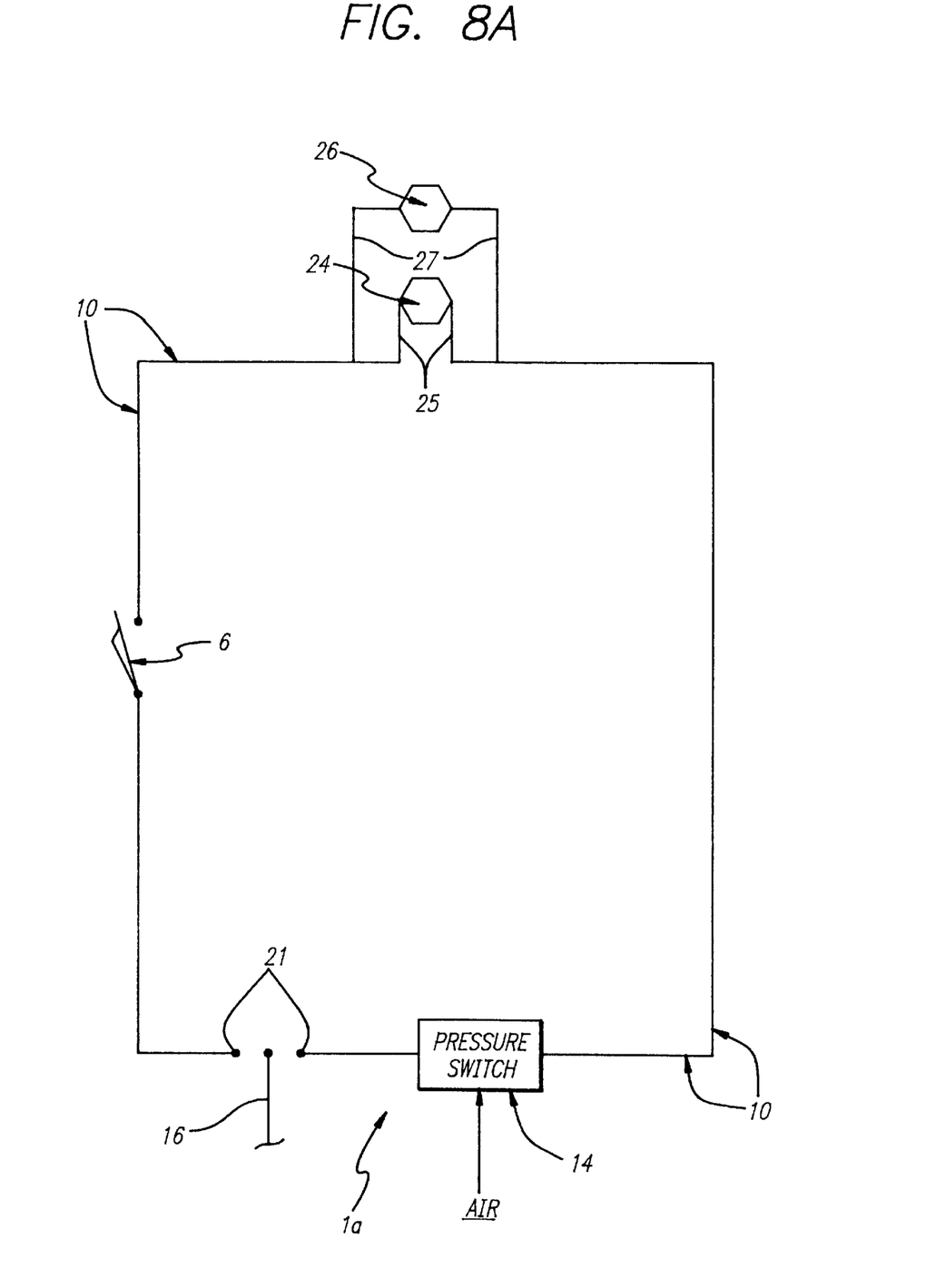
FIG. 8A is a schematic of an alternative electric circuit for operating the pressure sensor.

FIG. 8A illustrates an alternative, preferred operating circuit where the transformer 15 and relay 17 are eliminated in favor of a direct plug-in power source connection at the power receptacle 21, by the power source wiring 16. If the air pressure in the air supply line 55 falls to a preselected level by operation of the pressure-reducing element 1 as described with respect to the circuit represented by the schematic in FIG. 8, the pressure switch 14 will operate as described above, thus closing the circuit wiring 10 and activating the alarm lamp 24 and the audio alarm 26.

Referring again to FIGS. 1–2A and 7 of the drawings, the air compressor or blower 2 supplies air for the treatment tank 48 from the compressor discharge 3 to the air supply line 55, the air distribution line 51 and air drop lines 52 (FIGS. 1 and 2) and the distribution line legs 51a (FIGS. 1A and 2A) for dispersion through the diffusor openings 53, responsive to normal operation of the pressure sensor 4. This air also flows through the tee 37, as illustrated in FIGS. 1, 2 and 5 and is normally unimpeded in its flow through the tee run 38 of the tee 37, as further illustrated in FIG. 5. The unimpeded flow of air through the tee run 38 of the tee 37 is facilitated under low water, waste-water or sewage conditions in the treatment tank 48, where the ball float 31 is extended downwardly by gravity, as illustrated in FIG. 5 and the air deflector 33 is seated in the nipple mouth 44 of the pressure nipple 40. Uninterrupted flow of air through the air distribution line 51 and the distribution line legs 51a to the air drop lines 52 also produces a constant pressure in the elbow 47, in which is mounted the pressure-reducing element 1, as illustrated in FIGS. 1A, 2A, 5A and 5B.

In operation, according to a preferred embodiment of the method of this invention, and referring again to FIGS. 5, 5A, 5B, 5C, 6, 6A, 6B, 8 and 8A of the drawings, under circumstances where a high water, waste-water or sewage condition exists in the treatment tank 48, as the water level rises and contacts the ball float 31, the ball float 31 is displaced upwardly along with the ball shaft 32, (FIGS. 6 and 6A) and the float neck 11 (FIG. 6B), thus elevating the air deflector 33 from its seated position in the nipple mouth 44 of the pressure nipple 40. Under these circumstances, the air deflector 33 extends upwardly into the tee run 38 (FIG. 6) and the elbow 47 (FIGS. 6A and 6B) and deflects a portion of the air flowing through the tee run 38 and to the elbow 47, downwardly through the nipple bore 44, the air bypass openings 43 and the collar slots 46 in the ball collar 45 (FIGS. 6 and 6A) and through the air passages 11a of the float neck 11 (FIG. 6B), into the float sensor pipe 29 or the treatment tank 48, respectively. This deflection of air from the tee run 38 through the tee leg 39 and the elbow 47 lowers the air pressure in the tee run 38 and the elbow 47, as well as the air supply line 55. As further illustrated in FIGS. 5B, 5C and 6B, this result is accomplished as heretofore described, when the disc-shaped air deflector 33, mounted on the cross-sectionally x-shaped float neck 11, is displaced, along with the o-ring 23, from the nipple mouth 44, and air is allowed to flow through the elbow 47 and the longitudinal air passages 11a formed by the neck ribs 12 in the float neck 11, to reduce the air pressure in the elbow 47 and the air supply line 55. This pressure drop is sensed by the pressure-sensing element 1a, which operates as heretofore described to trigger the alarm lamp 24 and the audio alarm 26 and sound the audible and visual alarms and alert operators as to the high water or sewage condition in the treatment tank 48.

It will be appreciated by those skilled in the art that the pressure alarm for sewage treatment systems and tanks and the method of this invention are simple, yet highly useful and workable for substantially any high water, waste-water or sewage circumstance in treatment tanks of any description. The system does not depend upon conventional electrical contacts and wiring that may malfunction in high humidity or under submerged conditions. Furthermore, referring again to FIGS. 8 and 8A of the drawings, it will be appreciated that each of the circuit elements therein illustrated may be encased in epoxy or implemented in modular form in a printed circuit board, according to the knowledge of those skilled in the art, to facilitate easy replacement and minimize the effect of humidity, heat and other adverse environmental conditions. Similarly, referring again to FIGS. 5–6B of the drawings, it will be appreciated that the ball float 31 and float cap 31a may be constructed of plastic or metal as desired, and the tee 37, elbow 47, pressure nipple 40 and ball collar 45 may be constructed of such materials as plastic, fiberglass, metal and the like, depending upon the environment to which the pressure-reducing element 1 must be exposed. Moreover, while a preferred design of the pressure-reducing apparatus or system 1 and pressure-sensing apparatus or system 1a is illustrated in the drawings, it will be appreciated that the method of this invention encompasses the steps of using a float system for effecting a reduction in pressure in the air supply line of a water, sewage or waste-water treatment system or any water system requiring water level control, and sensing the pressure reduction to effect an alarm during a high water, waste-water or sewage condition.

While the preferred embodiments of the invention have been described above, it will be recognized and understood that various modifications may be made in the invention and the appended claims are intended to cover all such modifications which may fall within the scope and spirit of the invention.

Having described my invention with the particularity set forth above, what is claimed is:

1. A pressure alarm for a water treatment system having an air supply conduit for supplying air to the water at a selected pressure, said pressure alarm comprising float means extending from the air supply conduit above the water in a low water condition in the water treatment system; shaft means extending from said float means to the air supply conduit; air deflector means provided on said shaft means for extending into the air supply conduit and deflecting air from the air supply conduit along said shaft means and reducing the pressure of the air in the air supply conduit responsive to floating of said float means on the water in a high water condition in the water treatment system; and pressure-sensing alarm means pneumatically connected to the air supply conduit for sensing said reducing of the air in the air supply conduit and indicating the high water condition.

2. The pressure alarm of claim 1 comprising a fitting provided in said air supply conduit and at least one opening provided in said fitting, wherein said float means is positioned beneath said fitting, said shaft means extends through said fitting and said air deflector means normally seats in said fitting while air is flowing through the air supply conduit at said selected pressure in the low water condition and said air deflector means extends from said fitting and air flows from said air supply conduit through said opening in said fitting responsive to the high water condition.

3. The pressure alarm of claim 1 wherein said pressure-sensing alarm means comprises a pressure-sensing switch pneumatically connected to the air supply conduit for sensing said reducing of the air pressure in the air supply conduit in the high water condition and alarm means electrically connected to said pressure-sensing switch for activation responsive to operation of said pressure-sensing switch.

4. The pressure alarm of claim 1 comprising a fitting provided in said air supply conduit for receiving said air deflector means and at least one opening provided in said fitting wherein:

(a) said float means is positioned beneath said fitting, said shaft means extends through said fitting and said air deflector means normally seats in said fitting while air is flowing through the air supply conduit at said selected pressure in the low water condition, and said air deflector means extends from said fitting and air flows from said air supply conduit through said opening in said fitting responsive to the high water condition; and (b) said pressure-sensing alarm means comprises a pressure-sensing switch pneumatically connected to the air supply conduit for sensing said reducing of the air pressure in the air supply conduit in the high water condition and alarm means electrically connected to said pressure-sensing switch for activation responsive to operation of said pressure-sensing switch.

5. The pressure alarm of claim 2 comprising an elbow provided in said air supply conduit and wherein said fitting comprises a nipple seated in said elbow and said air deflector means extends into said elbow in the high water condition.

6. The pressure alarm of claim 5 wherein said pressure-sensing alarm means comprises a pressure-sensing switch pneumatically connected to the air supply conduit for sensing said reducing of the air pressure in the air supply conduit in the high water condition and alarm means electrically connected to said pressure-sensing switch for activation responsive to operation of said pressure-sensing switch.

7. The pressure alarm of claim 2 comprising a tee provided in said air supply conduit and wherein said fitting comprises a nipple seated in said tee and said air deflector means extends into said tee in the high water condition.

8. The pressure alarm of claim 7 wherein said pressure-sensing alarm means comprises a pressure-sensing switch pneumatically connected to the air supply conduit for sensing said reducing of the air pressure in the air supply conduit in the high water condition and alarm means electrically connected to said pressure-sensing switch for effecting an alarm responsive operation of said pressure-sensing switch.

9. The pressure alarm of claim 6 wherein said air deflector means comprises a substantially disc-shaped air deflector and an o-ring provided on said air deflector for normally seating in said nipple when air is flowing through the air supply conduit and applying substantially constant pressure in said elbow in the low water condition.

10. The pressure alarm of claim 8 wherein said air deflector means comprises a substantially cone-shaped deflector for normally seating in said nipple when air is flowing through the air supply conduit and said tee in the low water condition.

11. The pressure alarm of claim 2 wherein said air deflector means comprises an air deflector plate provided on said shaft means and air sealing means provided on said air deflector plate for normally seating in said fitting when air is flowing through the air supply conduit at said selected pressure.

12. The pressure alarm of claim 11 comprising an elbow provided in said air supply conduit and wherein said fitting comprises a nipple seated in said elbow and said air deflector means and said air sealing means extend into said elbow in the high water condition.

13. The pressure alarm of claim 12 wherein said pressure-sensing alarm means comprises a pressure-sensing switch pneumatically connected to the air supply conduit for sensing said reducing of the air pressure in the air supply conduit in the high water condition and alarm means electrically connected to said pressure-sensing switch for activation responsive to operation of said pressure-sensing switch.

14. The pressure alarm of claim 13 wherein said alarm means comprises a visual alarm.

15. The pressure alarm of claim 9 wherein said alarm means comprises an audible alarm.

16. The pressure alarm of claim 9 wherein said alarm means comprises both an audible and a visual alarm.

17. A pressure alarm for sensing high water in a sewage treatment system having an air supply conduit and a compressor or blower connected to the air supply conduit for supplying air to the system at a selected air pressure, said pressure alarm comprising pressure-sensing alarm means pneumatically connected to the air supply conduit; pressure-reducing apparatus characterized by a nipple seated in the air supply conduit; at least one air bypass opening provided in said nipple, said air bypass opening provided in air-communication with the air conduit; a float disposed beneath said nipple and a shaft extending from said float through said nipple; and air deflector means provided on said shaft for normally seating in said nipple in a first configuration when water in the sewage treatment system is lower than said float, said air deflector means extending from said nipple and deflecting air from said air conduit through said air bypass opening and activating said pressure-sensing alarm means in a second configuration when water in the sewage treatment system is floating said float.

18. The pressure alarm of claim 17 comprising an elbow provided in the air supply conduit and a slotted ball collar carried by said nipple and wherein said nipple is inserted in said elbow for exhausting said deflecting air from the air supply conduit through said air bypass opening and said slotted nipple; said float is positioned beneath said slotted ball collar; and said shaft extends through said nipple and said slotted ball collar into said elbow to said air deflector means.

19. The pressure alarm of claim 17 wherein said pressure-sensing alarm means comprises a sensing circuit connected to a source of electric power; a pressure-sensing switch provided in said sensing circuit, said pressure-sensing switch pneumatically communicating with the air supply conduit; and alarm means electrically connected to said sensing circuit and said pressure-sensing switch for indicating said second configuration of said air deflector means responsive to operation of said pressure-reducing apparatus.

20. The pressure alarm of claim 19 comprising an elbow provided in the air supply conduit and a slotted ball collar carried by said nipple and wherein said nipple is inserted in said elbow for exhausting said deflecting air from the air supply conduit through said air bypass opening and said slotted nipple; said float is positioned beneath said slotted ball collar; and said shaft extends through said nipple and said slotted ball collar into said elbow to said air deflector means.

21. A pressure alarm for sensing high water in a waste-water treatment system having an air supply conduit and a blower or compressor connected to the air supply conduit for supplying air to the system, said pressure alarm comprising:

(a) a pressure-sensing alarm apparatus characterized by a pressure-sensing switch pneumatically connected to the air supply conduit; a pressure-sensing circuit electrically connected to said pressure-sensing switch and to a source of electric power; and alarm means provided in said pressure-sensing circuit, whereby air pressure provided by the blower or compressor in said air supply conduit is applied to said pressure-sensing switch; and (b) a pressure-reducing apparatus characterized by an elbow provided in the air supply conduit; a nipple provided in said elbow; a float disposed beneath said nipple and a float neck extending from said float through said nipple; an air deflector provided on said float neck and seal means provided on said air deflector for normally seating said seal means on said nipple in a first configuration when water is lower than said float, said air deflector and said seal means extending from said nipple into said elbow in a second configuration when water floats said float, whereby air pressure in said air supply conduit is reduced by said air deflector and said pressure-sensing switch operates said pressure-sensing circuit to actuate said alarm means responsive to the reduction in air pressure in the air supply conduit in said second configuration.

22. The pressure alarm of claim 21 wherein said seal means comprises at least one o-ring.

23. A method for indicating a high water condition in a waste-water treatment tank or vessel having an aeration conduit for supplying air to the water in the tank or vessel, said method comprising the steps of providing a fitting in the conduit for selectively allowing air to escape from the conduit; locating a float beneath said fitting, providing an air deflector on said float, said air deflector normally closing said fitting to the conduit when said float is not contacting the water in the tank or vessel; and providing a pressure-sensing alarm system in said conduit, whereby said pressure-sensing alarm system is activated responsive to floating of said float on the water in the tank or vessel, extension of said air deflector into the conduit and escape of air from the conduit through said fitting to reduce the air pressure in the conduit.

24. A method for indicating a high water condition in a waste-water treatment tank or vessel having an aeration conduit for supplying air to the water in the tank or vessel, said method comprising the steps of providing an elbow in the conduit for selectively allowing air to escape from the conduit; locating a float beneath said elbow, providing an air deflector on said float, said air deflector normally closing said elbow to the conduit when said float is not contacting the water in the tank or vessel; and providing a pressure-sensing alarm system in said conduit, whereby said pressure-sensing alarm system is activated responsive to floating of said float on the water in the tank or vessel, extension of said air deflector into said elbow and escape of air from the conduit through said elbow to reduce the air pressure in the conduit.

* * * * *